Dec. 6, 1938.  G. ROUDANEZ  2,138,941
AUTOMATIC BOILER PRESSURE REGULATOR
Filed Feb. 6, 1937  2 Sheets-Sheet 1
Fig. 1
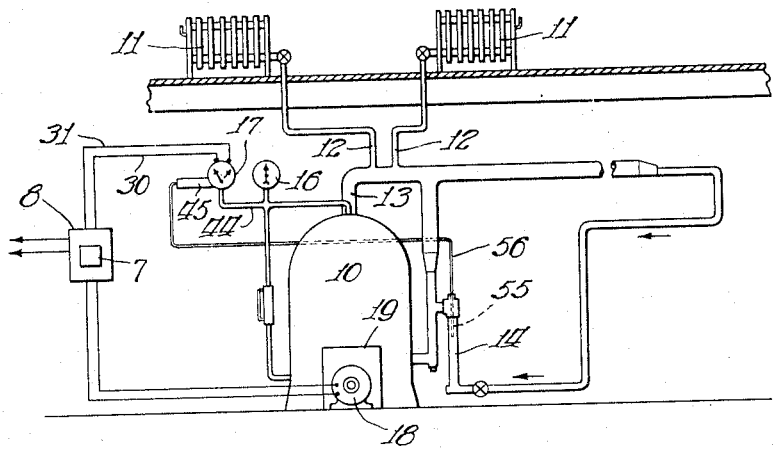
Fig. 5
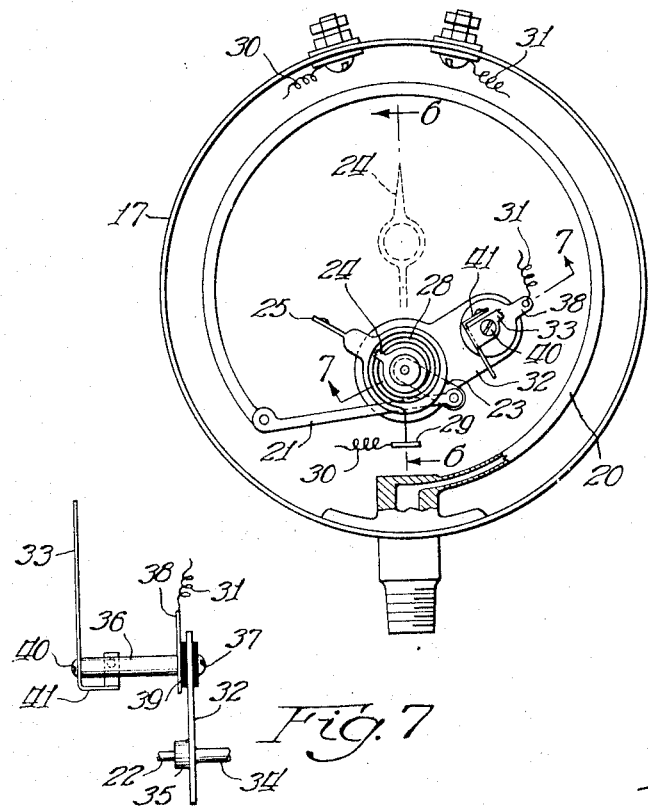
Fig. 6
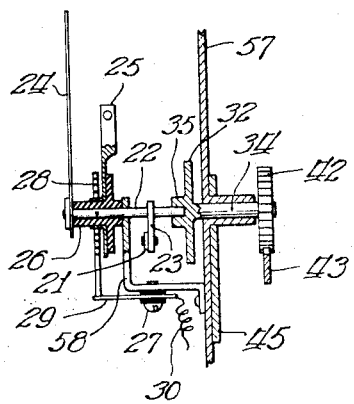
Fig. 7
Witness:
V. Silgander
Inventor:
Georges Roudanez.
By: Ernest E. Tupes
Atty

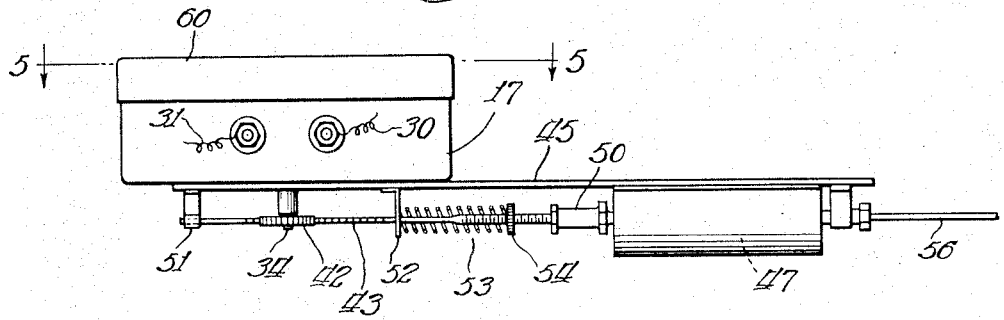
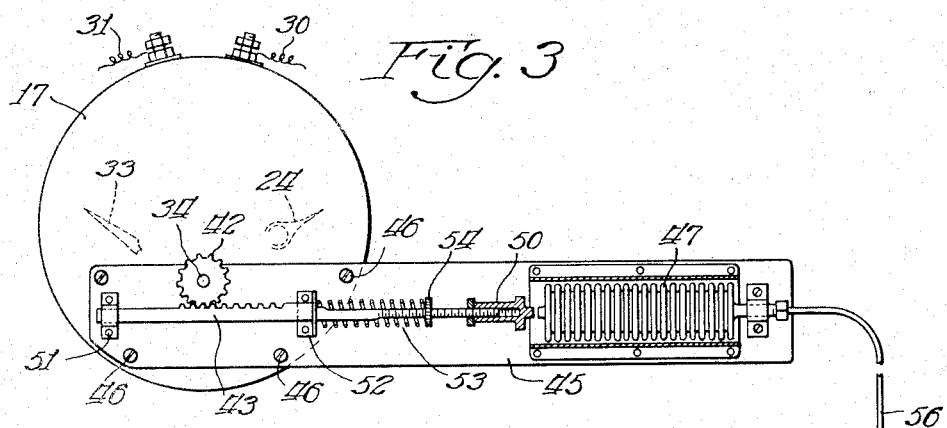
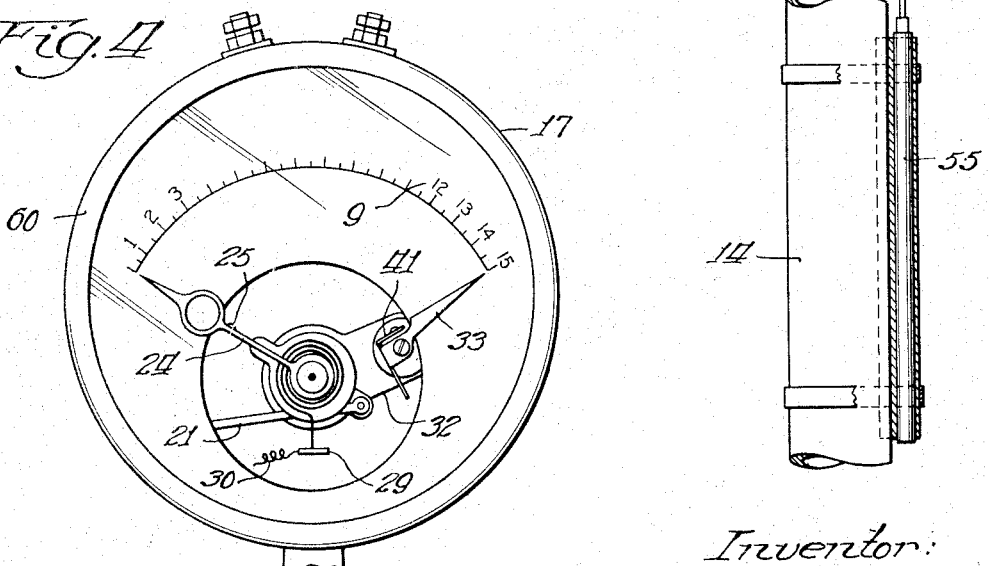

Patented Dec. 6, 1938

2,138,941

UNITED STATES PATENT OFFICE 2,138,941

AUTOMATIC BOILER PRESSURE REGULATOR

Georges Roudanez, Chicago, Ill.

Application February 6, 1937, Serial No. 124,418

7 Claims. (Cl. 236—14)

The invention relates to pressure regulating devices for steam boilers and more particularly it relates to an improved method and means for controlling the boiler pressure in steam heating plants.

The invention contemplates the provision of a novel method and means for automatically controlling and varying the boiler pressure in accordance with the temperature at some selected point indicative of the immediate heating requirements, such point being preferably on the return line as indicated by the temperature of the fluid condensate contents of said line. The automatic regulation of the boiler pressure in such a manner that the pressure is varied in accordance with the temperature of the fluid condensate in the return pipe or at some other point indicative of the changing requirements of the heating plant provides economies and advantages over the present method of controlling boiler pressures which as at present practiced usually consists in the arbitrary setting of a control device by the janitor or engineer to maintain the steam pressure approximately at a maximum which, in his judgment, will properly heat the building. An arbitrary setting of this character cannot be satisfactory since it does not take account of unforeseen changes in weather conditions and if the weather for example should unexpectedly become warmer, the selected pressure is maintained nevertheless with the result of excessive heat, discomfort, and waste of fuel. Moreover, an arbitrary maximum pressure setting which, if maintained, provides a satisfactory temperature for a building once it is heated, is not a setting which will enable a cool building to be rapidly heated but on the contrary will generally require a long time to produce the requisite normal temperature in the building. Variations in boiler pressure requisite to meet demands upon a heating plant due to sudden changes in weather conditions and to the desirability of rapidly heating a cold building, makes it necessary that the allowable maximum pressure be automatically varied with fluctuations in weather conditions and with the immediate heating requirements of the installation.

The temperature of the fluid condensate in the return pipe of a steam heating plant is a satisfactory criterion of the immediate heating and steam pressure requirements of the plant since so long as the building remains cool, the condensate will be at a lower temperature than that which it has when the building is at normal temperature.

The invention provides a thermo-responsive device, preferably operatively connected with the return line of the heating system and automatically operable to actuate a pressure control device whereby when the temperature of the fluid condensate is relatively low, the permissible maximum boiler pressure is correspondingly high and as the temperature of the condensate rises, the permissible maximum steam pressure is correspondingly lowered to maintain a proper balance contributing to uniform heating without waste of fuel. The thermo-responsive and pressure control device of the invention cooperate to regulate the steam pressure indirectly, preferably by stopping and starting a motor which operates an automatic stoker in the case of hard fuel being used or controls a pressure pump or valve regulating device if fluid fuel is used and which also regulates the admission of air for combustion. Stopping of combustion entirely or in part or any increase in the rate of combustion is reflected almost immediately in respectively lowering or raising the boiler pressure and it is one of the objects of the invention to provide a novel steam pressure control device whereby the allowable maximum steam pressure automatically changes in accordance with the heating requirements as indicated by the temperature of the fluid condensate in the return line or by the prevailing temperature at other selected points either outside or inside the building to be heated.

Another object of the invention is the provision of an improved steam pressure control device and cooperating thermo-responsive means for actuating the pressure control device in a manner to vary the maximum steam pressure in a boiler by automatic control of the delivery of fuel and the rate of combustion thereof.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings wherein like reference characters indicate like or corresponding parts:

Fig. 1 is a diagrammatic view in elevation of a heating plant equipped with the devices embodying the principles of the invention;

Fig. 2 is a plan view of a pressure gauge showing a portion of the inventive device as mounted on the rear of the gauge;

Fig. 3 is an elevational view of the construction shown in Fig. 2 looking towards the rear of the gauge;

Fig. 4 is a front elevational view of the gauge shown in Figs. 2 and 3;

Fig. 5 is a front elevational view of the gauge shown in Figs. 2 and 3 with the cover removed;

Fig. 6 is a sectional view along the line 6—6 of Fig. 5; and

Fig. 7 is a view along the line 7—7 of Fig. 5.

Referring now more particularly to the drawings:

Fig. 1 diagrammatically illustrates a steam heating plant including a boiler 10, a plurality of radiators 11, a plurality of individual supply lines 12 respectively connecting the radiators with the main supply line 13, a return line 14, a boiler pressure gauge 16, and a special pressure gauge 17 operatively connected with the return line 14 by devices embodying the invention. Fig. 1 also shows a motor 18 operable to actuate a device 19, both being shown diagrammatically. In case hard fuel is used, the device 19 may be taken as illustrating a stoker, or if fluid fuel is used it may illustrate an oil or gas supply controlled by the motor 18. The device 19 may also include a draft regulator, it being understood that the above designated elements shown in Fig. 1 may be any standard or special equipment of a steam heating system, and that further illustrations or descriptions thereof are omitted as being unnecessary to an understanding of the invention which resides primarily in the provision of a thermo-actuated pressure control mechanism operatively connecting the return line 14 with the pressure gauge 17 in a manner such that the combustion of fuel under the boiler is regulated and the permissible maximum boiler pressure is automatically raised or lowered as the temperature of the condensate in the return line drops or rises.

The motor 18 is operated by a source of electrical energy, not shown, and is connected with the gauge 17 by a pair of conductors 30 and 31. The motor 18 is controlled in the usual manner by a relay switch 7 mounted on a panel or switch board 8. The circuit of which the conductors 30 and 31 form a part is automatically opened and closed by thermo-responsive elements operable as a result of changes in the temperature of the fluid condensate contained in the return line 14, as hereinafter more particularly described.

A suitable pressure responsive element such as a Bourdon tube 20 is mounted in the gauge 17 and connected directly with the boiler 10 through a tube 44. The tube 20 in expanding and contracting under varying boiler pressures actuates a link 21 to oscillate a shaft 22 with which the link is operatively connected by an arm 23 fixedly mounted on the shaft. Oscillation of the shaft 22 carries with it an indicator pointer 24 and an adjacent contact member 25 both fixedly mounted on the shaft. The indicator pointer 24 is shown in Figs. 4 and 5 as positioned at zero reading on a dial 9, this reading indicating that there is no pressure in the boiler. The pointer 24 is broken away in Fig. 5 to more fully disclose the contact member 25. As the pressure rises in the boiler the pointer 24 and member 25 are moved by the tube 20 in clockwise direction as observed in Fig. 5.

An insulating sleeve 26 separates the hub of the contact member 25 from the shaft 22 and adapts the member to be a part of the circuit breaking device in the circuit connecting the gauge 17 with the motor 18. A bracket 58 provides a support for the shaft 22 and for a binding post 27 mounted in the gauge 17. A member 29 mounted on and insulated from the post 27 is connected with the contact member 25 by a spiral spring 28 extending around the insulating sleeve 26 in such a manner that the spring resists the expansive movement of the tube 20 and tends to pull the tube back to its position of zero boiler pressure. The spring 28 and member 29 connect the contact member 25 with the conductor 30 and form part of the circuit leading to the motor 18. A shaft 34, oscillatable by fluctuations in the temperature of the fluid condensate in the return pipe 14, is integrally formed with an arm 32 and extends through the back wall 57 of the housing of the gauge 17. The shaft 34 is longitudinally aligned with the shaft 22 and he arm 32 provides a recessed hub 35 in which the adjacent end of the shaft 22 is journalled and supported to permit independent oscillation of the shafts. The free end of the arm 32 carries a bar 36 extending parallel to the shafts 22 and 34. The bar 36 is fastened to the arm 32 by a screw bolt 37 and between the bar and the arm is positioned a plate 38 with which the conductor 31 is connected. The plate 38 is insulated from the arm 32 by a member 39 and the opposite end of the bar 36 carries an indicator pointer 33 rigidly fastened to the bar by means of a screw bolt 40. One end of the pointer 33 is revolvable over the dial 9 and its other end is projected inwardly and then transversely to the bar 36 to provide a contact member 41 so positioned as to engage the contact member 25 when the indicator pointers 24 and 33 are rotated into coincidence. Engagement of the contact members 25 and 41 closes the circuit through the conductors 30 and 31 thereby actuating the relay switch 7 to stop the motor 18. Stopping of the motor also stops delivery of fuel and lowers the rate of combustion whereby the boiler pressure is decreased as a result of the engagement of the contact members 25 and 41.

The oscillation of the shaft 34 by changes in temperature of the return line condensate, whereby the contact member 41 and the pointer 33 are oscillatable through an arc of a circle measured by the arcuate dial 9, is accomplished by an attachment mounted on the gauge 17 and extending to the return pipe 14. For this purpose the end of the shaft 34 is projected through the back wall 57 of the housing of the gauge 17 and on the projecting end of the shaft is mounted a pinion 42. The attachment includes a plate 45 fastened at one end to the housing of the gauge 17 by a plurality of screws 46. A "sylphon" type bellows 47, mounted on the other end of the plate 45, is operatively connected with the pinion 42 by means of a rod 43. The rod 43 is provided with teeth forming a rack operatively engaging the pinion 42 whereby contraction and expansion of the bellows 47 actuates the pinion to oscillate the shaft 34 and also the indicator pointer 33 and the contact member 41 carried by the shaft. Adjustment of the movement of the rack 43 and the pinion 42 to adapt such movement to different bellows and requisite sweep of indicator pointers is accomplished by shifting the position of a sleeve 50 connecting the bellows 47 with the rack rod 43. The rack or toothed end of the rod 43 is held in operative engagement with the pinion 42 by guide members 51 and 52 suitably mounted on the plate 45. A helical spring 53 mounted on the rod 43 tends constantly to cause the rod to follow the bellows 47 to its contracted position. A collar 54 threaded on the rod 43 provides an adjustable abutment for the spring 53 and by shifting the position of the collar the resistance of the spring 53 to expansion of the bellows 47 may be varied as desired.

A thermometer bulb 55 is mounted on the return pipe 14 in intimate contact therewith as best shown in Fig. 3, the mounting being such that changes in temperature of the condensate correspondingly affects the contents of the thermometer. The bulb 55 is connected to the bellows 47 by a capillary tubing 56 partially filled with liquid. A rise and fall of the temperature of the return line condensate respectively causes expansion and contraction of the liquid contents of the tubing 56. Expansion of the liquid contents of the tubing 56 extends the bellows 47 longitudinally and thereby moves the rod 43 against the resistance of the spring 53 and rotates the pointer 24 in clockwise direction as observed in Fig. 4. Contraction of the liquid contents of the tubing 56 correspondingly retracts the end of the bellows 47 adjacent to the sleeve 50 and permits the rod 43 to be moved by the spring 53 to follow the retracting bellows and thereby rotate the pointer 24 in counter-clockwise direction over the dial 9. The means controlling the movement of the rod 43 is adjusted to stop the counter-clockwise movement of the pointer 24 in the position shown in Fig. 4 when the return line condensate is cold.

The operation of the device may be described as follows:

Assuming the building to be cool and no steam in the boiler, the pressure indicator pointer 24 and the bellows actuated pointer 33 respectively occupy the positions shown in the drawings. A switch 7, shown on the panel board 8, is operated to connect the motor 18 with a source of electrical energy. Operation of the motor starts the delivery of fuel and temporarily maintains the maximum rate of combustion of fuel under the boiler 10. As steam is generated, the pressure rises and actuates the Bourdon tube 20 to move the pointer 24 in clockwise direction, the pointer carrying with it the contact member 25. While the steam pressure is initially rising more or less rapidly as described, the condensate in the return pipe remains cool and there is slight or little compression of the bellows to actuate the pointer 33 and with it the contact member 41. As a result of the comparatively rapid rise of the steam pressure and the slow rise in temperature of the condensate, the pointer 24 will move over the greater portion of the dial 9 before the contact member 25 engages the contact member 41 to close the circuit and actuate the relay switch 7 to stop the motor 18. The engagement of the contact members will not occur therefore until there is a boiler pressure well above the normal which is necessary to be maintained in order to maintain a desired constant temperature in the building.

As the combustion of fuel slows down by the stopping of the motor, the steam pressure also starts to drop but since the building has by this time become well heated, the temperature of the condensate continues to rise. As a result of the rising temperature of the condensate, and the drop in pressure of the steam, the pointer 33 and contact member 41 will continue to move in counter-clockwise direction carrying along with them the pointer 24 and contact member 25. Meanwhile, the drop in pressure will result in substantially constant temperature of the condensate and as a result, the contact members 25 and 41 will be disengaged and break the circuit leading to the relay switch 7. This again starts the operation of the motor and results in temporarily increased combustion of fuel followed by a rise in steam pressure which will shortly again bring the contact members into engagement. The described intermittent engagement and disengagement of the contact members finally results in an approximately constant boiler pressure and condensate temperature, the device being so set that this will correspond to the desired temperature of the building. Obviously, the normal temperature of the building will be maintained constant at a much lower steam pressure on warm than on cold days but the apparatus, as described, will operate to stop delivery of fuel and check combustion in accordance with the temperature of the condensate in the return line, thereby avoiding overheating of the building and preventing any fluctuation in the temperature except slight fluctuations above and below the normal.

Thus it will be seen that I have provided a novel method and devices for controlling the steam pressure in boilers whereby the maximum permissible boiler pressure is automatically varied to enable a cool building to be rapidly heated followed by maintenance of a substantially constant pressure which coincides with the fluctuating heat requirements due to changing weather conditions, such maximum steam pressure being automatically varied in such a manner that a substantially constant temperature is maintained throughout a building by automatic variations in boiler pressures.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a heating plant, a boiler, a combustion chamber, a device operable to deliver fuel into said chamber, a motor operable to actuate said fuel delivery device, a circuit controlling the operation of the motor, apparatus for automatically varying the maximum boiler pressure in accordance with maximum heating requirements of the plant, said apparatus consisting of a circuit breaker comprising two members independently movable into and out of contact with each other to respectively close and open the circuit, means responsive to changes in boiler pressure arranged to actuate one of said members, and a thermostatic element responsive to temperatures at a selected point remote from the boiler arranged to actuate the other of said members.

2. In a heating plant, a boiler, a combustion chamber, a device operable to deliver fuel into said chamber, a motor operable to actuate the fuel delivery device, a circuit controlling the operation of the motor, a circuit breaker comprising two members independently movable into and out of contact with each other to respectively close and open the circuit, means responsive to changes in boiler pressure arranged to actuate one of said members, and a thermostatic element arranged to actuate the other of said members, said element being positioned at a point where temperatures are partially influenced by changes in the boiler pressure.

3. In a heating plant, a boiler, a combustion chamber, a device operable to deliver fuel into said chamber, a motor operable to actuate the fuel delivering device, a circuit controlling the operation of the motor, apparatus for automatically varying the maximum boiler pressure consisting of a circuit breaker comprising two members independently movable into and out of contact with each other to respectively close and open the circuit, means responsive to changes in boiler pressure arranged to actuate one of said members, and a thermostatic element positioned at a distance from the boiler and arranged to actuate the other of said members.

4. In a heating plant, a boiler, means for heating the boiler, mechanism operable to control the amount of heat produced and thereby to vary the boiler pressure, a radiator, a supply line and a return line connecting the boiler and radiator, a circuit controlling the operation of said mechanism, apparatus for automatically varying the maximum boiler pressure in accordance with the temperature of the return line, said apparatus consisting of a circuit breaker comprising two members independently movable into and out of contact with each other to respectively open and close said circuit, means responsive to changes in boiler pressure arranged to actuate one of said members and a thermostatic element responsive to return line temperatures arranged to actuate the other of said members.

5. In a heating plant, a boiler, means for heating the boiler, a radiator, a supply line and a return line connecting the boiler and radiator, a motor operable to control the heating means and thereby to control the boiler pressure, a circuit controlling the operation of the motor, apparatus for automatically varying the maximum boiler pressure in accordance with the temperature of the return line, said apparatus consisting of a circuit breaker comprising two members independently movable into and out of contact with each other to respectively close and open the circuit, means responsive to boiler pressure arranged to actuate one of said contact members, and a thermostatic element responsive to return line temperatures arranged to actuate the other of said members, said members being respectively movable in the direction of contact by rising boiler pressure and rising return line temperature and respectively movable in the opposite direction by falling boiler pressure and falling temperature of the return line.

6. In a heating plant, a boiler, a radiator, a supply and return line connecting the boiler and radiator, a combustion chamber operatively related to the boiler, means operable to control combustion of fuel in said chamber and thereby to correspondingly vary the boiler pressure, a motor actuating said means, a power circuit connecting the motor with a source of electrical energy, a relay switch operable to open and close the power circuit, a secondary circuit controlling the relay switch, said secondary circuit when closed maintaining the relay switch in the open position of the main circuit and when open maintaining said switch in closed position of the main circuit, apparatus for automatically varying the maximum permissible boiler pressure in accordance with the temperature of the return line, said apparatus consisting of a circuit breaker for said secondary circuit comprising two contact members reciprocally and independently movable in a common path, mechanism actuated by fluctuations in the boiler pressure to move one of said members back and forth in said path, thermo-responsive means operable by fluctuations in the temperature of the return line to move the other of said members back and forth in said common path, increasing and decreasing boiler pressures respectively causing said first-mentioned contact member to move toward and away from the member actuated by said thermo-responsive means, rising and falling temperatures respectively causing said thermo-responsive means to move the contact member controlled thereby toward and away from the pressure actuated contact member.

7. In a heating plant, a boiler, a radiator, a supply and return line connecting the boiler and radiator, a combustion chamber operatively related to the boiler, means operable to control combustion of fuel in said chamber and thereby to correspondingly vary the boiler pressure, a motor actuating said means, a power circuit connecting the motor with a source of electrical energy, of apparatus for automatically controlling the boiler pressure in accordance with the temperature of the return line, said apparatus comprising a relay switch operable to open and close the power circuit, a secondary circuit controlling the relay switch, said secondary circuit when closed maintaining the relay switch in the open position of the main circuit and when open maintaining said switch in closed position of the main circuit, a circuit breaker for said secondary circuit comprising two contact members reciprocally and independently movable in a common path, mechanism actuated by fluctuations in the boiler pressure to move one of said members back and forth in said path, thermo-responsive means operable by fluctuations in the temperature of said return line to move the other of said members back and forth in said common path, increasing and decreasing boiler pressures respectively causing said pressure actuated contact member to move toward and away from the member controlled by said thermo-responsive means, rising and falling temperatures of the return line respectively causing the contact member controlled thereby to move toward and away from the pressure actuated contact member, said members when in contact closing the secondary circuit and thereby opening the main circuit and checking combustion in said chamber.

GEORGES ROUDANEZ.